(12) United States Patent
Scheb

(10) Patent No.: US 9,680,327 B2
(45) Date of Patent: Jun. 13, 2017

(54) RF ENERGY HARVESTING BY A NETWORK NODE

(71) Applicant: Landis+Gyr Innovations, Inc., Alpharetta, GA (US)

(72) Inventor: Jeffrey E. Scheb, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 313 days.

(21) Appl. No.: 14/318,970

(22) Filed: Jun. 30, 2014

(65) Prior Publication Data

US 2015/0380973 A1 Dec. 31, 2015

(51) Int. Cl.
*H01F 27/42* (2006.01)
*H01F 37/00* (2006.01)
*H01F 38/00* (2006.01)
*H02J 7/02* (2016.01)
*H02J 5/00* (2016.01)
(Continued)

(52) U.S. Cl.
CPC ............... *H02J 7/025* (2013.01); *H02J 5/00* (2013.01); *H02J 17/00* (2013.01); *H02J 50/20* (2016.02); *H04B 1/1607* (2013.01); *H04W 52/0251* (2013.01); *H04W 52/0296* (2013.01); *H04W 52/0216* (2013.01); *H04W 52/0248* (2013.01)

(58) Field of Classification Search
CPC .. H02J 5/005; H02J 7/025; H02J 17/00; H02J 50/12; H02J 50/10; H02J 50/90; H02J 50/80; H02J 7/00; H02J 7/0042; H02J 2007/0096; H02J 50/20; H02J 50/60; H02J 7/04; H02J 50/05; H02J 50/27

USPC ......................................................... 307/104
See application file for complete search history.

(56) References Cited

U.S. PATENT DOCUMENTS 6,490,257 B1 * 12/2002 Watanabe ............ H04B 7/0608
370/318
2006/0104291 A1 * 5/2006 Rodriguez ............... H04B 3/54
370/401
(Continued)

FOREIGN PATENT DOCUMENTS

WO 2007079490 7/2007
WO 2016003552 1/2016

OTHER PUBLICATIONS

Ostaffe, "RF-based Wireless Charging and Energy Harvesting Enables New Applications and Improves Product Design", mouser.com, Applications & Technologies, at least as early as Mar. 28, 2014, 2 pages.
(Continued)

*Primary Examiner* — Jared Fureman
*Assistant Examiner* — Esayas Yeshaw
(74) *Attorney, Agent, or Firm* — Kilpatrick Townsend & Stockton LLP

(57) ABSTRACT

Disclosed are various embodiments for energy harvesting by circuitry of a node in a network. The node operates in a communication mode that includes communicating, via an RF transceiver, data with another node in the network. The node includes an energy storage device that provides power for the node. The node switches, via an RF switch, from said communication mode to an energy harvest mode. The energy harvest mode includes receiving RF emissions accessible to the node via an antenna. The RF emissions are converted to DC electrical energy, and the DC energy is stored in the energy storage device.

19 Claims, 5 Drawing Sheets

US 9,680,327 B2
Page 2

(51) Int. Cl.
*H02J 17/00* (2006.01)
*H04B 1/16* (2006.01)
*H02J 50/20* (2016.01)
*H04W 52/02* (2009.01)

(56) References Cited

U.S. PATENT DOCUMENTS

| | | | |
|---|---|---|---|
| 2009/0174361 A1* | 7/2009 | Duron | H02J 17/00 320/101 |
| 2010/0134257 A1* | 6/2010 | Puleston | G06K 7/0008 340/10.4 |
| 2010/0142509 A1 | 6/2010 | Zhu et al. | |
| 2012/0161721 A1* | 6/2012 | Neethimanickam | H02J 17/00 320/167 |
| 2013/0137455 A1* | 5/2013 | Xia | H02J 17/00 455/456.1 |
| 2013/0234536 A1* | 9/2013 | Chemishkian | H02J 17/00 307/149 |
| 2013/0257360 A1* | 10/2013 | Singh | H01F 38/14 320/108 |
| 2014/0004912 A1 | 1/2014 | Rajakarunanayake | |
| 2014/0111032 A1 | 4/2014 | Shearer et al. | |
| 2014/0159647 A1* | 6/2014 | Nishioka | H02J 7/025 320/107 |
| 2014/0370830 A1* | 12/2014 | Steer | H04W 52/18 455/127.1 |
| 2015/0369870 A1* | 12/2015 | Okada | H01M 10/44 324/430 |

OTHER PUBLICATIONS

Publitek Marketing Communication, "Tune in, Charge up: RF Energy Harvesting Shows Its Potential", Digi-Key Electronics, May 29, 2013, 5 pages.
PCT/US2015/032367, "International Search Report and Written Opinion", Nov. 2, 2015, 16 pages.
International Application No. PCT/US2015/032367, Invitation to Pay Additional Fees and Partial Search Report mailed on Aug. 17, 2015, 6 pages.

* cited by examiner

RF ENERGY HARVESTING BY A NETWORK NODE

BACKGROUND

A communications module for a gas or water meter (or any other battery-powered utility device) must be able to support a battery life of 15-20 years. This is primarily achieved through the use of efficient energy-storage batteries as well as by minimizing the power consumption of the communications module (radio). In order to minimize power consumption, the radio may spend most of its time in a low-power "sleep" mode, waking up on some periodic basis to communicate any data with its network and then returning to sleep.

Replacing exhausted batteries in numerous such devices deployed in operation is a time-consuming and difficult task. Increasing the usable life-span of the batteries in these metering devices can produce significant savings in time and money for utility operators.

SUMMARY

Various aspects of the present invention relate to capturing ambient radio frequency (RF) emissions in order to supplement the energy stored by a node, such as a utility meter that may be deployed as part of an advanced metering infrastructure (AMI) system. In one implementation, the node operates in a communication mode that includes communicating, via an RF transceiver, data with another node in the network. The node includes an energy storage device, such as a battery, that provides power for the node. In various embodiments, the node may not be connected to an external source of power.

The node uses an RF switch in order to switch from the communication mode to an energy harvest mode. The mode switch may occur as a result of the node also entering a low-energy sleep mode and/or having no additional data to be communicated via the network. The energy harvest mode includes receiving RF emissions accessible to the node via an antenna and does not attempt to decode the RF emissions. The node converts the RF emissions to direct current (DC) energy and stores the DC energy in the energy storage device. The RF emissions may be converted to DC energy using a rectifier. The node may switch back to the communication mode based in part upon having data to be transmitted, data scheduled to be received, and/or other possible circumstances.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
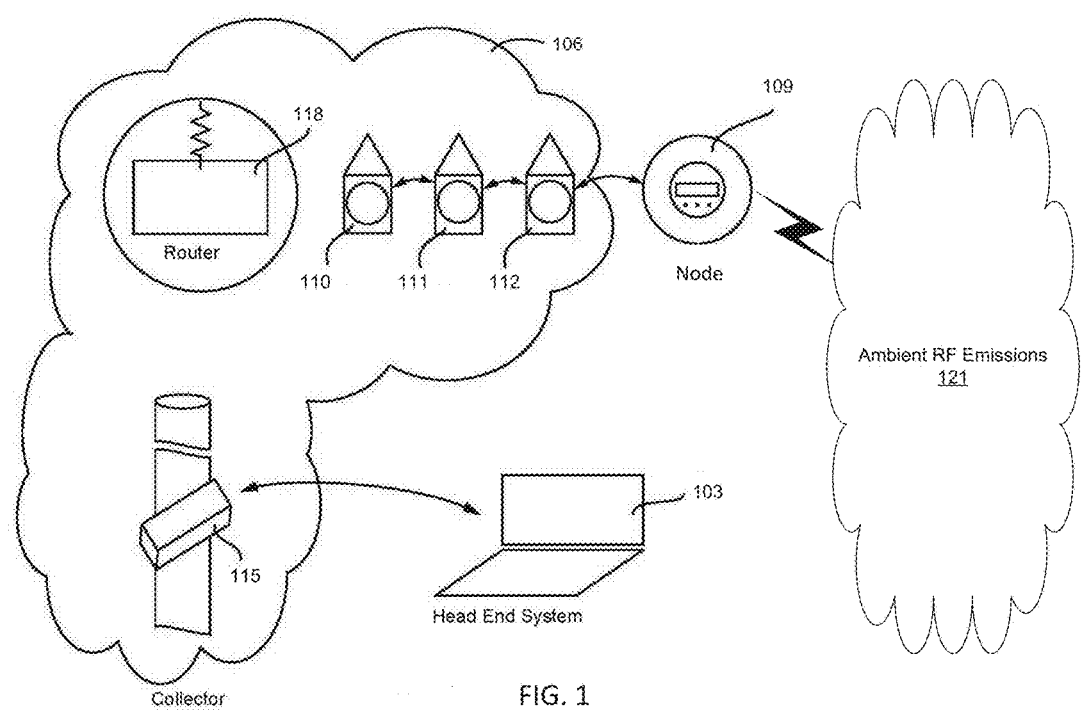
FIG. 1 is a drawing of a networked environment according to various embodiments of the present disclosure.

The techniques disclosed herein are directed to a node capturing ambient RF emissions in order to supplement the energy provided to the node by an energy storage device. The node may use an antenna to capture the energy from RF emissions from various commercially used RF bands, such as cellular, broadcast television, and unlicensed industrial, scientific and medical (ISM) bands (900 MHz and 2.4 GHz). For example, research studies have shown an ambient RF energy density of between −60 and −14 $dB/m^2$ in typical urban environments, all within the 685 MHz to 3.5 GHz frequency range. In these studies, the most energy was found to be in the 1.8-1.9 GHz band.

A node, such as used in a meter for utility service (e.g. electricity, water or gas) as part of an AMI (advanced metering infrastructure) network, can incorporate one or more wideband antennas tuned for all or a portion of these frequency bands. The wideband antenna would collect or "harvest" the RF energy, which could then be converted to a DC electrical energy by, for example, an RF/microwave rectifier circuit. The DC output of the rectifier would then be stored in an energy storage device of the node, such as a battery or supercapacitor, via a charging circuit. The energy stored in the energy storage device would then provide DC power for the node during its operation. While the amount of energy harvested may not be equivalent to the energy consumed by the node during all stages of operation, the energy may be used to supplement the energy stored in the energy storage device.

As defined herein, a "node" includes an intelligent device capable of performing functions related to distributing messages in a mesh network. In one system, a node can be a meter located at a facility, such as a house or apartment, that measures the consumption of a utility such as gas, water, or electric power. Such a meter can be part of an RF network used for AMI. Other examples of nodes include a router, collector or collection point, host computer, hub, or other electronic device that is attached to a network and is capable of sending, receiving, or forwarding information over a communications channel.

A node can contain several components that enable it to function within implementations of the present invention. For example, a node can include a radio that can enable it to communicate with like nodes and/or other devices in the mesh network. The radio of each node may have a programmable logic controller (PLC)-like device that can enable the radio to function like a computer, carrying out computer and command functions to provide implementations of the present invention described herein. A node may also include a storage medium for storing information related to communication with other nodes. Such storage mediums can include a memory, a floppy disk, CD-ROM, DVD, or other storage devices located internal to the node or accessible by the node via a network, for example. A node may also include a crystal oscillator (i.e. a clock) to provide timekeeping and an energy storage device (e.g. a battery) to provide back-up power. Some nodes may be powered only by an energy storage device.

With reference to FIG. 1, shown is an exemplary illustration of a mesh network that may be employed as part of an AMI or other metering network. The head-end system 103 controls the metering network by communicating through the network 106. The network 106 that the head-end system 103 may utilize to communicate to a node 109 may include devices such as other nodes, 110-112, collectors 115, routers 118, and possibly other devices. Communication may proceed utilizing any appropriate protocol and any appropriate network configuration. Protocols used by the network 106 include, but are not limited to the IEEE 802.15.4, PRIME, G3, and/or TCP/IP protocols. Several nodes 109-112 may transmit data to a router 118. The router 118, in turn, may route data to a collector 115 in the network 106. A collector may receive data from multiple routers. The collector 115 communicates with the head-end system 103. The head-end system may receive and send information to multiple collectors.

The nodes, such as the node 109, may be meters that are usually in geographically dispersed locations such as homes or businesses. The meters are used to monitor a utility resource such as electricity, water, or natural gas and to measure the usage of the resource. Some meters may be smart meters that support a variety of service commands. These service commands may allow utilities to disconnect, or limit service remotely or manually at the meter. In addition, some meters may store an event log that contains entries of functions the meter has performed. Service commands may originate from the head-end system 103 and are sent via the network 106 to nodes 109-112.

To support functionality and continuous operation of a meter, the node 109 may include an energy storage device either as a supplemental/backup power source or as a sole power source. In order to reduce the electrical power consumed during operation the node 109, may use an antenna to capture the energy from ambient RF emissions 121 from various commercially used RF bands, such as cellular, broadcast television, and ISM bands. While harvesting RF emissions in this manner has the benefit of reducing electrical power consumed from other sources, it can be especially critical when the node is reliant upon an energy storage device as the only power source for an extended period.

In some embodiments, the node 109 may begin harvesting energy from the ambient RF emissions 121 during periods in which no communications are expected to occur. During such periods, a portion of the components of the node 109 may enter a low-energy "sleep" mode in order to conserve electrical power. In these embodiments, an RF switch may be used to switch the one or more antennas of the node from the transceiver circuitry to the circuitry used for RF harvesting.

In other embodiments, a node may harvest energy from the ambient RF emissions 121 independent of communications of node through the use of antenna(s) and other circuitry that is separate from the communications circuitry. In these embodiments, the RF harvesting may occur continuously or when a threshold is met associated with the energy storage device of the node (e.g. the energy level is less than 50% of capacity).

In addition, a node may communicate with other devices of the network 106 in order to request these devices to begin transmitting RF emissions in order to augment the ambient RF emissions 121 received by the node. Such a scenario would typically occur with, for example, a battery-powered node requesting that another device powered from an external source provide additional RF emissions. A request for additional RF emissions may occur, for example, when the energy storage device of the node reaches a threshold, when the ambient RF emissions 121 are insufficient, and/or based upon other criteria.

Figure 2:
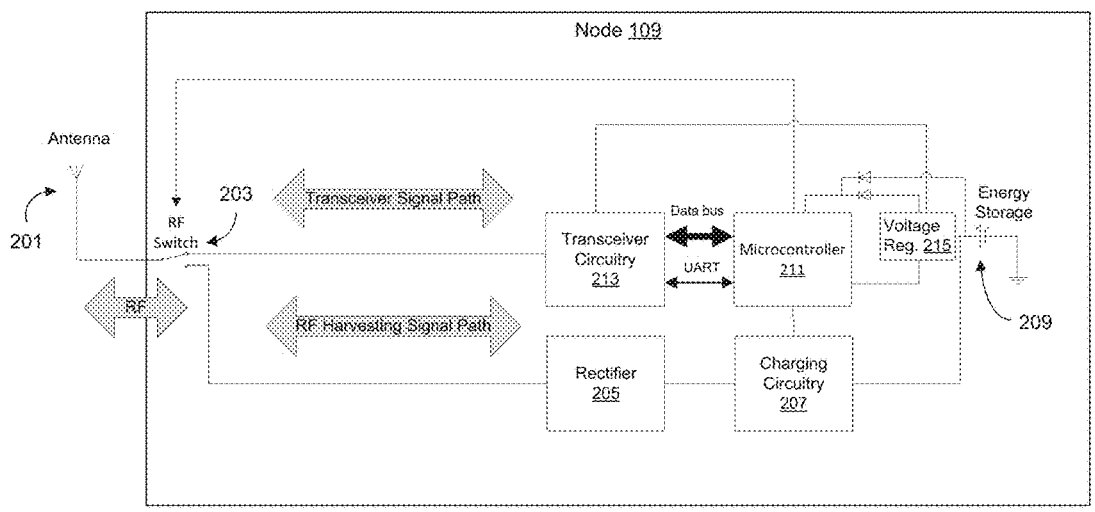
FIG. 2 is a block diagram of an illustrative example of a node in the networked environment of FIG. 1 according to various embodiments of the present disclosure.

Referring next to FIG. 2, shown is a block diagram of an illustrative embodiment of the node 109 which implements the RF harvesting techniques. The node 109 includes one or more antennas, represented by the antenna 201, which may be used to transmit and receive communications for the node 109, as well as capture RF emissions to be stored as energy. The design of the antenna 201 may be affected by the RF band(s) at which the node communicates in a network 106 and the RF band(s) at which the node will capture RF emissions. For example, the antenna 201 may include an antenna for the ISM 900 MHz bands, in addition to another antenna used for the 1.8-1.9 GHz RF bands.

In this illustrative embodiment of FIG. 2, the antenna 201 is connected to an RF switch 203 that connects the antenna 201 to either the transceiver signal path or the RF harvesting signal path. As described previously, other arrangements allowing, for example, simultaneous RF harvesting and data communication may also be possible. In FIG. 2, the transceiver signal path includes the circuitry used for communicating data to and from the node 109, while the RF harvesting signal path includes the circuitry used to charge the energy storage device using the captured RF emissions. A node may be said to operate in a "communication mode" while the transceiver signal path is selected via the RF switch, and in an "RF harvest mode" while the RF harvesting signal path is selected.

The RF harvesting signal path comprises a rectifier 205, charging circuitry 207, an energy storage device 209, and/or other components not described in detail herein. The rectifier 205 is an RF/microwave rectifier that converts the energy from the captured RF emissions as input to a DC electrical energy output. The rectifier may be implemented using, for example, diodes.

The charging circuitry 207 may adjust the voltage or other components of the DC output from the rectifier 205 to a form suitable for storing in the energy storage device 209. The energy storage device 209 represents one or more energy storage devices such as a battery, capacitor, supercapacitor, and/or other electrical energy storage devices. In the embodiment shown in FIG. 2, the energy storage device 209 is the only source of power for the node 109, though other configurations that use an external power source in conjunction with a local energy storage device are possible.

A microcontroller 211 is responsible for managing the operation and data communications of the node 109. To this end, the microcontroller 211 manages the RF switch 203 and the transceiver circuitry 213 that facilitates transmission and reception of data along the transceiver signal path. In some embodiments, the microcontroller 211 may also monitor charging of the energy storage device 209 via the charging circuitry 207. The various components of the node 109 may receive electrical power from the energy storage device 209. The electrical power from the energy storage device 209 may be adjusted by the voltage regulator 215 in order to accommodate the electrical needs of disparate electrical components. For example, the voltage regulator 215 may adjust the 3.0 V output from the energy storage device to the 3.45 V required by the microcontroller 211.

Figure 3:
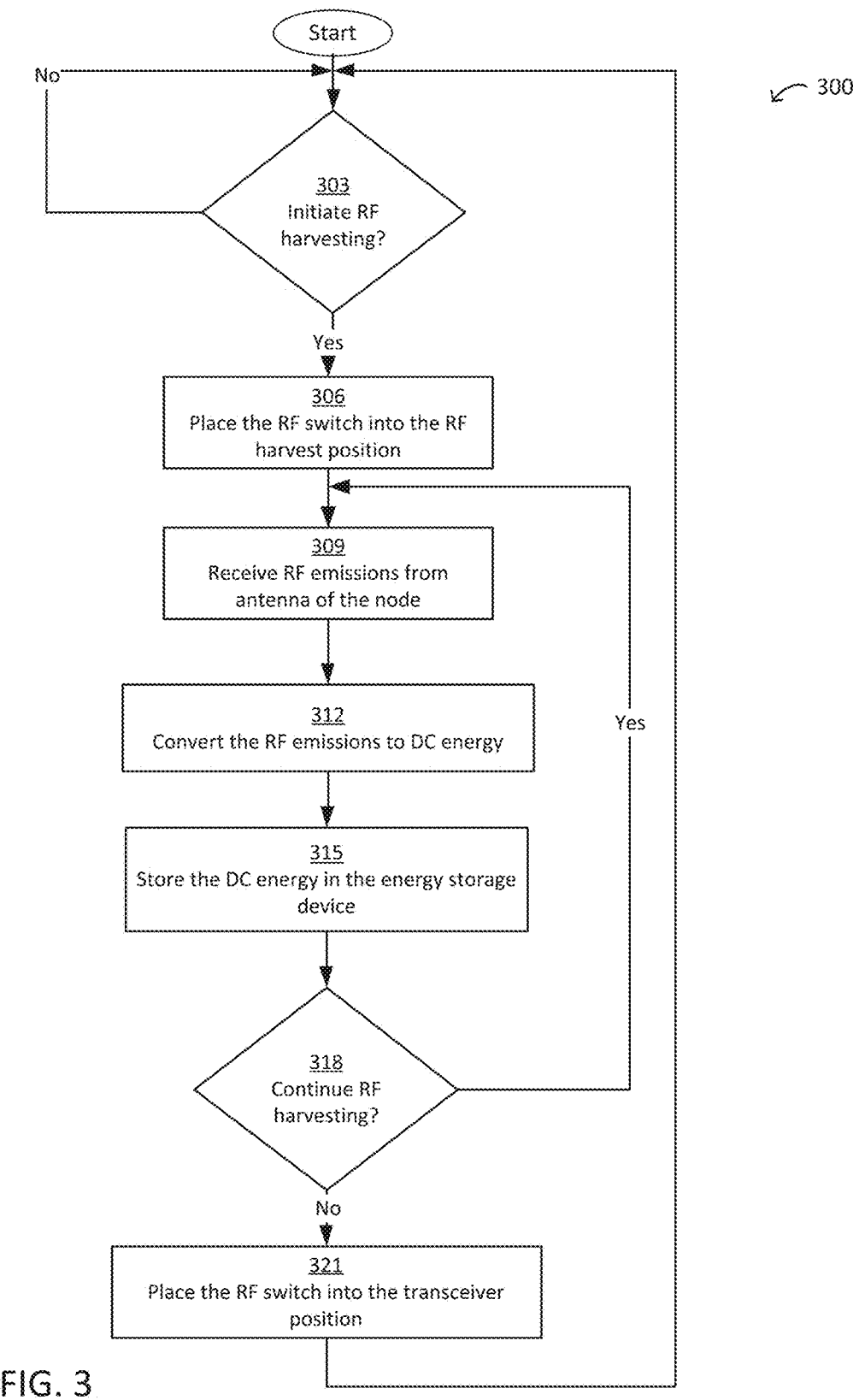
FIG. 3 is a flowchart illustrating one example of RF harvesting functionality implemented in a node in the networked environment of FIG. 1 according to various embodiments of the present disclosure.

Referring next to FIG. 3, shown is a flowchart that provides an exemplary implementation of the RF harvesting operations for a method 300 of a node, such as the node 109, according to various embodiments. It is understood that the flowchart of FIG. 3 provides merely an example of the many different types of functional arrangements that may be employed to implement the RF harvesting operations of the method 300 as described herein. The operations depicted in the flowchart of FIG. 3 illustrate the transition of the node from operating in a communication mode to operating in a harvest mode. As described previously, variations of this implementation may also be possible allowing a node to communicate via a network, while concurrently capturing energy from ambient RF emissions.

Beginning with block 303, the node determines whether to begin the RF harvest mode or to remain in the communication mode. The determination may be made based upon the current or expected data communications with other devices in a network, a threshold in the energy storage device of the node, and/or other criteria as can be appreciated. For example, if the node had no current data communication taking place, nor any that were expected, some components (e.g. the transceiver circuitry) of the node might enter a low-power "sleep mode," at which time the node may also enter a harvest mode to capture RF emissions. Similarly, if the node detected that the energy level of the energy storage device was, for example, below a threshold of 50%, the node may begin RF harvesting instead of taking place in non-essential communications.

If the node determines that RF harvesting is not ready to begin, then execution of the method 300 returns to block 303. Alternatively, if RF harvesting should be initiated, in block 306, the node may place the RF switch in a position to provide received RF emission to the RF harvesting signal path. Thereafter, in block 309, the node may receive RF emissions via the one or more antennas of the node. The node may use the antenna(s) to capture the energy from RF emissions from various commercially used RF bands, such as cellular, broadcast television, ISM bands (900 MHz and 2.4 GHz), and/or other possibilities. For example, research studies have shown an ambient RF energy density of between −60 and −14 dB/m2 in typical urban environments, all within the 685 MHz to 3.5 GHz frequency range. In these studies, the most energy was found to be in the 1.8-1.9 GHz band.

Next, in block 312, the rectifier of the node converts the energy from the various received RF emissions to DC electrical energy. Then, in block 315, the DC energy output from the rectifier may be stored in the energy storage device of the node through use of charging circuitry. The charging circuitry may be used to monitor and adjust the characteristics of the DC energy used to charge the energy storage device, monitor the current capacity of the energy storage device, and/or other possible re-charging functions. In some embodiments, some or all of the DC energy output from the rectifier may be used to directly power, at least in part, one or more other components of the node such as, for example, the microcontroller. During periods of low power usage, such as during the sleep mode, the energy collected from RF emissions may be sufficient to provide a substantial portion of the power consumed by various components (e.g. the microcontroller).

Subsequently, in block 318, the node determines whether to continue the RF harvesting (i.e. harvest mode). The determination may be made based upon the current or expected data communications with other devices in a network, a threshold in the energy storage device of the node, and/or other criteria as can be appreciated. For example, if the node detected that the energy level of the energy storage device was at a threshold of 100%, the node may no longer need to continue to harvest the energy since no more capacity exists to store it. Similarly, if the node is scheduled to soon report a utility meter reading to a head-end system, the node may end the harvest mode in order to deliver the scheduled communication data.

In the event that the RF harvesting is determined to continue, execution of the method 300 returns to block 309. Alternatively, if it is determined that the current period of RF harvesting should end, in block 321, the node places the RF switch in a position that connects the antenna to the transceiver signal path in order to enable the node to communicate with other devices in the network. Thereafter, execution of the method 300 may return to block 303.

Figure 4:
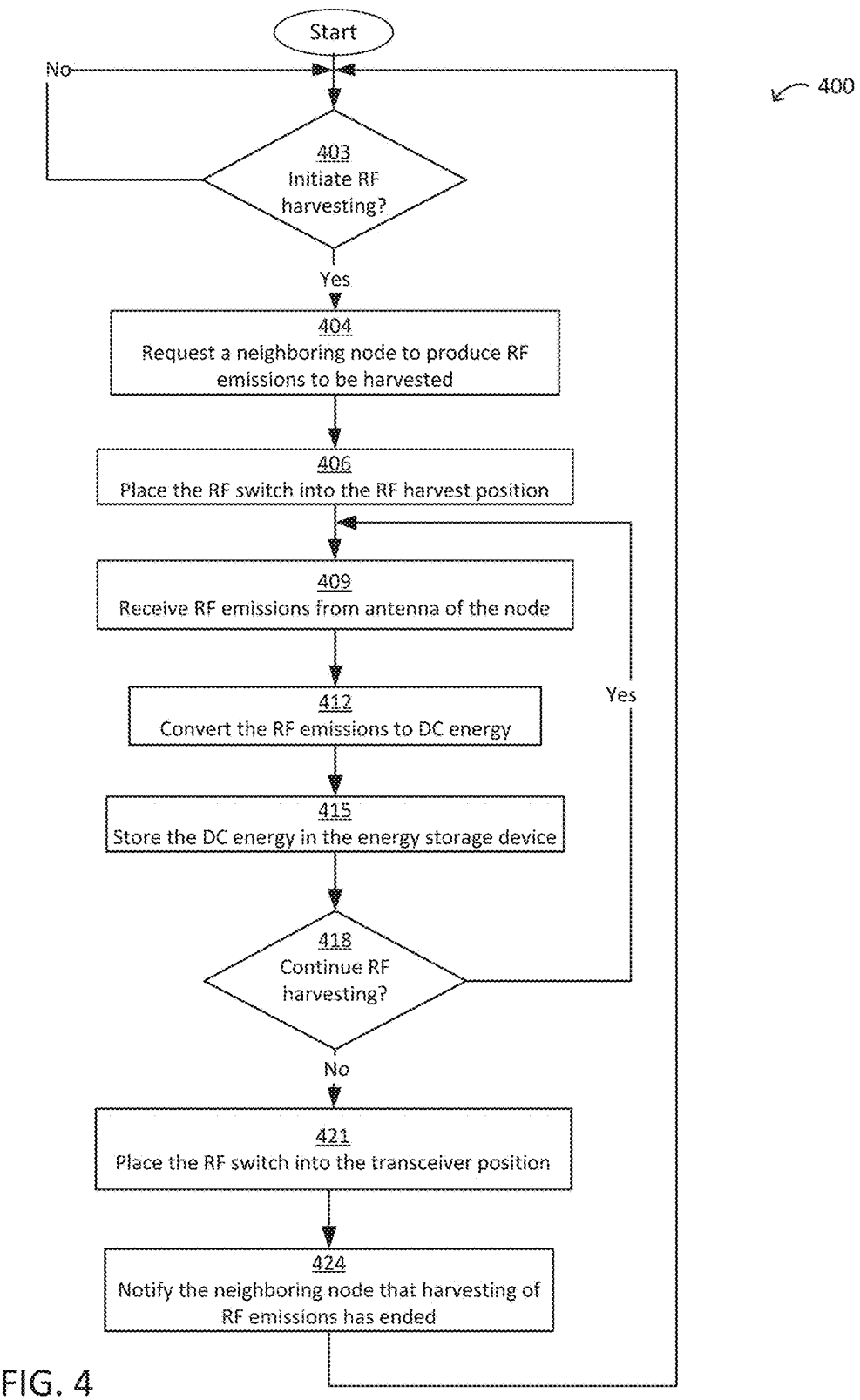
FIG. 4 is a flowchart illustrating another example of RF harvesting functionality implemented in a node in the networked environment of FIG. 1 according to various embodiments of the present disclosure.

Moving on to FIG. 4, shown is a flowchart that provides another exemplary implementation of the RF harvesting operations for a method 400 of a node, such as the node 109, according to various embodiments. It is understood that the flowchart of FIG. 4 provides merely an example of the many different types of functional arrangements that may be employed to implement the RF harvesting operations of the method 400 as described herein. The operations depicted in the flowchart of FIG. 4 illustrate the transition of the node from operating in a communication mode to operating in a harvest mode, where the node requests a neighboring node to supplement the ambient RF emissions by generating additional RF emissions to be harvested by the node. As described previously, variations of this implementation may also be possible allowing a node to communicate via network, while concurrently capturing energy from ambient RF emissions.

Beginning with block 403, the node determines whether to begin the RF harvest mode or to remain in the communication mode. The determination may be made based upon the current or expected data communications with other devices in a network, a threshold in the energy storage device of the node, and/or other criteria as can be appreciated.

If the node determines that RF harvesting is not ready to begin, then execution of the method 400 returns to block 403. Alternatively, if RF harvesting should be initiated, in block 404, the node may communicate with one or more neighboring nodes in the network to request that the node(s) produce additional RF emissions in order to supplement the energy received during the harvest mode. Typically, a node would make a request to neighboring nodes known to have an external power source (i.e. power supplied through the electric utility grid) or that otherwise have a substantial reserve of energy available.

Then, in block 406, the node may place the RF switch in a position to provide received RF emission to the RF harvesting signal path. Thereafter, in block 409, the node may receive RF emissions via the one or more antennas of the node. The neighboring node(s) responding to the request for addition RF emissions may produce a continuous waveform (CW) of RF energy that may be received by the requesting node, as well as other nodes in the area. The node may use the antenna(s) to capture the energy from RF emissions from various commercially used RF bands, such as cellular, broadcast television, ISM bands (900 MHz and 2.4 GHz), and/or other possibilities.

Next, in block 412, the rectifier of the node converts the energy from the various received RF emissions to DC electrical energy. Then, in block 415, the DC energy output from the rectifier may be stored in the energy storage device of the node through use of charging circuitry. The charging circuitry may be used to monitor and adjust the characteristics of the DC energy used to charge the energy storage device, monitor the current capacity of the energy storage device, and/or other possible re-charging functions.

Subsequently, in block 418, the node determines whether to continue the RF harvesting (i.e. harvest mode). The determination may be made based upon the current or expected data communications with other devices in a network, a threshold in the energy storage device of the node, and/or other criteria as can be appreciated. For example, if the node detected that the energy level of the energy storage device was at a threshold of 100%, the node may no longer need to continue to harvest the energy since no more capacity exists to store it. Similarly, if the node is scheduled to soon report a utility meter reading to a head-end system, the node may end the harvest mode in order to deliver the scheduled communication data.

In the event that the RF harvesting is determined to continue, execution of the method 400 returns to block 409. Alternatively, if it is determined that the current period of RF harvesting should end, in block 421, the node places the RF switch in a position that connects the antenna to the transceiver signal path in order to enable the node to communicate with other devices in the network. As an optional step, in block 424, once the node has returned to the communication mode, the node may transmit a notification to the neighboring nodes indicating that the node is no longer in harvest mode and that the transmission of additional RF emission is no longer needed by the node. In some implementations, the neighboring nodes producing additional RF emissions as requested in block 404 may do so for a predefined period of time. Thereafter, execution of the method 400 may return to block 403.

Figure 5:
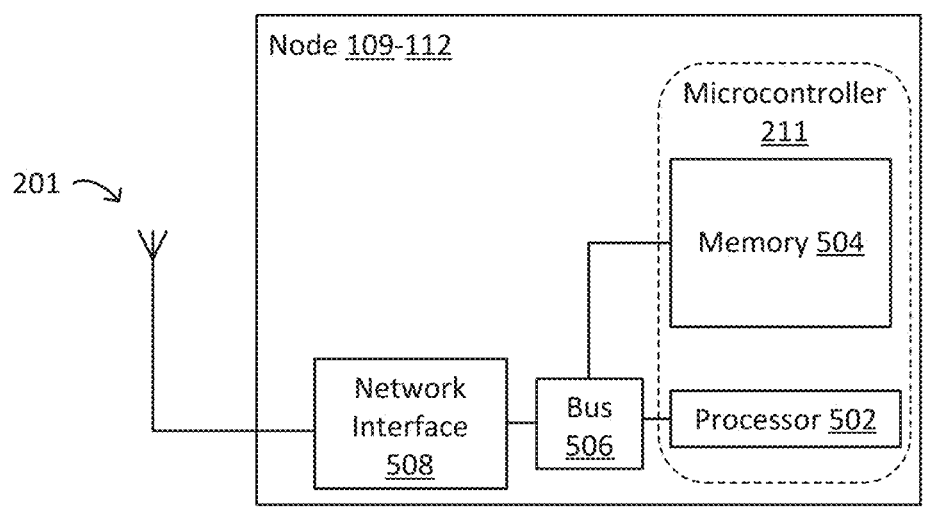
FIG. 5 is a block diagram that provides another example illustration of a node employed in the networked environment of FIG. 1 according to various embodiments of the present disclosure.

Next, in FIG. 5, shown is another block diagram depicting an example of a node 109-112 used for implementing the techniques disclosed herein. The node 109-112 can include a processing device 502. Non-limiting examples of the processing device 502 include a microprocessor, an application-specific integrated circuit ("ASIC"), a state machine, or other suitable processing device. The processing device 502 can include any number of processing devices, including one. The processing device 502 can be communicatively coupled to computer-readable media, such as memory device 504. The processing device 502 can execute computer-executable program instructions and/or access information respectively stored in the memory device 504. In some implementations, the processor 502 and memory 504 may be incorporated as components of a microcontroller, such as the microcontroller 211.

The memory device 504 can store instructions that, when executed by the processing device 502, cause the processing device 502 to perform operations described herein. The memory device 504 may be a computer-readable medium such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The nodes 109-112 can include a bus 506 that can communicatively couple one or more components of the node 109-112. Although the processor 502, the memory 504, and the bus 506 are depicted in FIG. 5 as separate components in communication with one another, other implementations are possible. For example, the processor 502, the memory 504, and the bus 506 can be components of printed circuit boards or other suitable devices that can be disposed in a node 109-112 to store and execute programming code.

The nodes 109-112 can also include network interface device 508, such as may be implemented by the transceiver circuitry 213. The network interface device 508 can be a transceiving device configured to establish one or more of the wireless communication links via an antenna 201. A non-limiting example of the network interface device 508 is an RF transceiver and can include one or more components for establishing a communication links to other nodes 109-112 in the mesh network 106.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A method for energy harvesting by circuitry of a node in a network, comprising:
   operating in a communication mode comprising:
      communicating, via a radio frequency (RF) transceiver, data with another node in the network, wherein the node comprises an energy storage device that provides power for the node; and
   in response to occurrence of a time period during which no further data communication is scheduled in the node, switching, via an RF switch in the node, from said communication mode to an energy harvest mode comprising:
      receiving RF emissions accessible to the node via an antenna;
      providing the received RF emissions to a rectifier;
      converting the RF emissions to direct current (DC) energy, wherein said converting is implemented using the rectifier; and
      storing the DC energy in the energy storage device.

2. The method of claim 1, further comprising switching back to the communication mode when the node determines additional data needs to be transmitted or received by the node, the communication mode further comprising:
   receiving additional RF emissions accessible to the node via the antenna; and
   decoding the additional data from the additional RF emissions.

3. The method of claim 1, wherein the node is a utility meter deployed as part of an advanced metering infrastructure (AMI) system.

4. The method of claim 1, wherein the energy storage device is the only source of electrical power for the node during operation.

5. The method of claim 1, wherein said switching to the energy harvesting mode is based at least in part upon the node determining that a sleep mode can begin.

6. The method of claim 1, wherein said receiving RF emissions comprises receiving a plurality of RF signals in one or more RF bands.

7. A node, comprising:
   a processor;
   an antenna;
   a radio frequency (RF) switch for switching connectivity to the antenna;
   an energy storage device that provides power for the node;
   a rectifier;
   an RF transceiver for communicating on a network accessible to the node; and
   a memory configured by a management application executed in the node, the management application comprising logic causing the node to:
      operate in an energy harvest mode comprising:
         receiving RF emissions accessible to the node via the antenna;
         converting, via the rectifier, the RF emissions to direct current (DC) energy; and
         storing the DC energy in the energy storage device; and
      in response to occurrence of a time period during which data communication is scheduled in the node, switch, via the RF switch, from said energy harvest mode to a communication mode comprising:
         communicating, via the RF transceiver, data with another node in the network, wherein said communicating uses power from the energy storage device.

8. The node of claim 7, wherein said switch to the communication mode occurs when the node determines additional data needs to be transmitted or received by the node.

9. The node of claim 8, wherein the additional data needs to be transmitted or received by the node on a periodic basis.

10. The node of claim 7, wherein the management application further comprises logic to request the other node in the network to transmit additional RF emissions to the node.

11. The node of claim 7, wherein the network is a wireless mesh network of a plurality nodes that includes the node.

12. The node of claim 7, wherein the RF transceiver operates in one or more of the industrial, scientific and medical (ISM) RF bands.

13. The node of claim 12, wherein said receiving RF emissions comprises receiving a plurality of RF signals in one or more RF bands, a portion of the one or more RF bands being outside the ISM RF bands.

14. A non-transitory computer-readable medium embodying a program executable by a processor of a node, comprising:
   code for operating the node in a communication mode comprising:
      communicating, via a radio frequency (RF) transceiver, data with another node in a network, wherein the node comprises an energy storage device that provides power for the node;
   code for operating the node in an energy harvest mode comprising:
      receiving RF emissions accessible to the node via an antenna;
      providing the received RF emissions to a rectifier;
      converting the RF emissions to direct current (DC) energy, wherein said converting is implemented using the rectifier; and
      storing the DC energy in the energy storage device; and code for switching, via an RF switch in the node, between the modes based upon a determination made in the node, wherein the node switches to the energy harvesting mode in response to occurrence of a time period during which no further data communication is scheduled in the node.

15. The non-transitory computer-readable medium of claim 14, wherein the node receives electrical power only from the energy storage device in the node.

16. The non-transitory computer-readable medium of claim 15, wherein the program further comprises code for requesting the other node in the network to transmit additional RF emissions to the node, wherein the other node receives electrical power from an external source.

17. The non-transitory computer-readable medium of claim 14, wherein the node is a utility meter deployed as part of an advanced metering infrastructure (AMI) system.

18. The non-transitory computer-readable medium of claim 14, wherein the determination comprises switching to the energy harvest mode based upon a power level of the energy storage device reaching a threshold.

19. The non-transitory computer-readable medium of claim 14, wherein the determination comprises switching to the energy harvest mode based upon a completion of a scheduled data communication.

* * * * *